United States Patent [19]

Sharp

[11] 3,710,044
[45] Jan. 9, 1973

[54] JACKSCREW TYPE OF RACKING MECHANISM FOR A MOVABLE SWITCHGEAR UNIT

[75] Inventor: William T. Sharp, Philadelphia, Pa.
[73] Assignee: General Electric Company
[22] Filed: Dec. 23, 1971
[21] Appl. No.: 211,394

[52] U.S. Cl. .............................200/50 AA, 317/103
[51] Int. Cl. ..........................H01h 9/20, H01h 33/46
[58] Field of Search ....200/50 R, 50 A, 50 AA, 50 B, 200/50 C, 38 E, 33 D, 17 R, 18; 317/103

[56] References Cited

UNITED STATES PATENTS

| | | | |
|---|---|---|---|
| 2,777,024 | 1/1957 | West | 200/50 A |
| 2,885,502 | 5/1959 | Eichelberger et al. | 200/50 AA |
| 3,217,211 | 11/1965 | Norden | 317/103 |
| 3,219,771 | 11/1965 | Umphrey | 200/50 AA |
| 3,440,371 | 4/1969 | Netzel et al. | 317/103 X |

Primary Examiner—J. R. Scott
Attorney—J. Wesley Haubner et al.

[57] ABSTRACT

For racking a movable switchgear unit into and out of its enclosure, a racking mechanism is disclosed which comprises a jackscrew mounted on the movable switchgear unit, a traveling nut mounted on the jackscrew, and an anchoring device mounted on the enclosure having an opening receiving a lug on the traveling nut. A housing for the jackscrew contains a first slot extending axially of the jackscrew for holding the lug in said opening in the anchoring device during racking movement. The jackscrew housing also contains a second slot perpendicular to the first slot into which said lug can be moved when the nut is being uncoupled from the anchoring device. Friction means causes the nut to rotate with the jackscrew when the nut is properly positioned for uncoupling from the anchoring device, thereby causing jackscrew-rotation under these conditions to move the lug from the opening in the anchoring device into said second slot.

12 Claims, 7 Drawing Figures

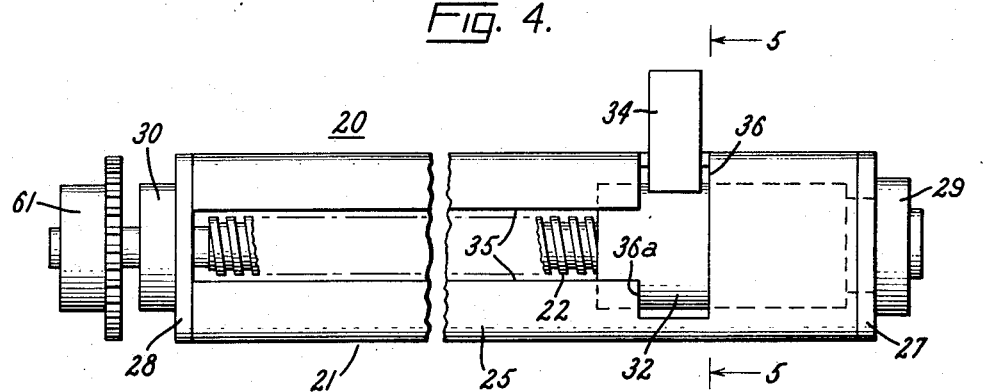
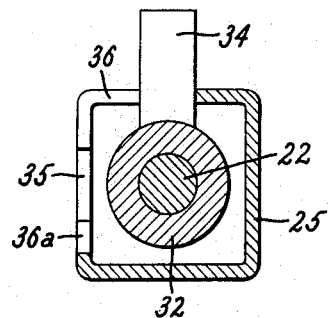
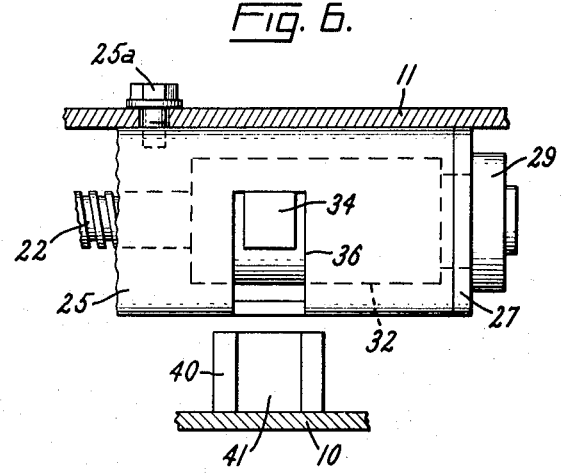
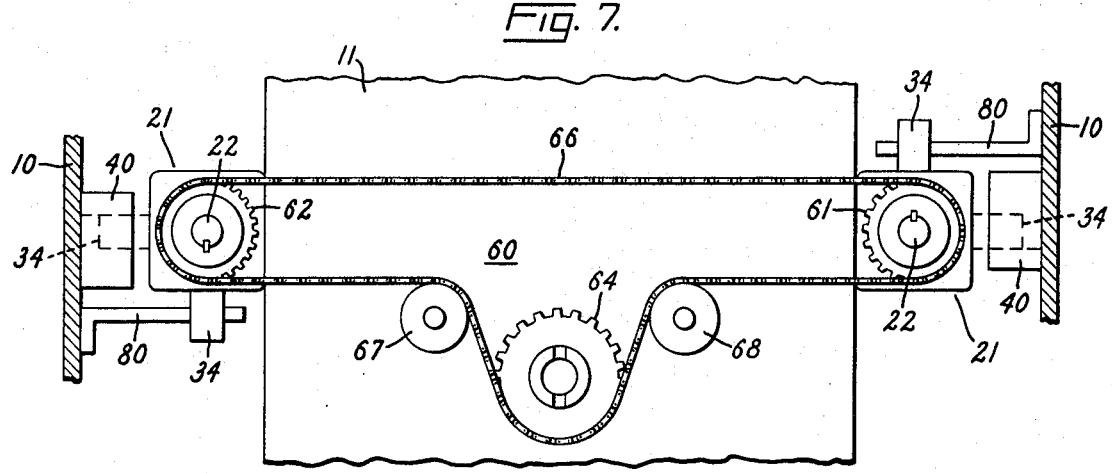

3,710,044

JACKSCREW TYPE OF RACKING MECHANISM FOR A MOVABLE SWITCHGEAR UNIT

BACKGROUND

This invention relates to electric switchgear of the drawout type and, more particularly, relates to a jackscrew type of racking mechanism for forcing a movable switchgear unit into and out of a connected position within an enclosure.

The usual jackscrew type of racking mechanism comprises a long jackscrew which projects far out ahead of the movable switchgear unit. Typically, this jackscrew has a free end for engaging a nut carried by the enclosure into which it can be threaded to effect racking motion. An example of this type of racking mechanism is shown and claimed in U.S. Pat. No. 3,440,371-Netzel et al. assigned to the assignee of the present invention.

One disadvantage of this type of jackscrew racking mechanism is that it requires relatively precise alignment of the movable switchgear unit within the enclosure in order to assure that the jackscrew will properly mesh with its cooperating nut. This precise alignment is especially important if the movable switchgear unit is a large one having two such jackscrews at its opposite sides since each of these jackscrews must properly mesh with its cooperating nut.

Another disadvantage of the above mentioned type of prior jackscrew racking mechanism is that the jackscrew, projecting as it does far ahead of the switchgear unit and relatively unprotected when the switchgear unit is withdrawn, is susceptible to mechanical damage from blows or contact with foreign objects.

SUMMARY

An object of my invention is to provide a jackscrew type of racking mechanism which can tolerate a substantial amount of misalignment between the movable switchgear unit and its enclosure, even though two widely spaced jackscrews might be used in the racking mechanism.

Another object is to provide a jackscrew type of racking mechanism wherein the jackscrew does not project far in front of the main working portion of the movable switchgear unit and is well protected against being damaged by contact with foreign objects.

In carrying out the invention in one form, I provide a racking mechanism comprising a jackscrew mounted on the movable switchgear unit for rotation with respect to the switchgear unit. The jackscrew extends generally parallel to the direction that the switchgear unit moves within its enclosure. Mounted on the jackscrew is a traveling nut having a lug projecting radially therefrom. The jackscrew is movable axially with respect to the nut when rotated relative to the nut, thereby effecting racking movement of the switchgear unit if rotated relative to the nut while the nut is held against movement relative to the enclosure. Fixed to the enclosure is an anchoring device having an opening adapted to receive the lug and hold the nut against movement relative to the enclosure when the jackscrew is being rotated to effect racking movement of the switchgear unit. For holding the lug in the opening in the anchoring device while the jackscrew is being rotated to effect racking movement, I provide structure fixed to the switchgear containing a first slot extending axially of the jackscrew for receiving the lug while the switchgear unit is undergoing racking movement. This structure also includes a second slot extending generally perpendicular to the first slot for receiving the lug when the lug is aligned with the second slot and the nut is rotated in one direction together with the jackscrew. This rotation in said one direction of the nut together with the jackscrew when the lug is aligned with the second slot causes the lug to withdraw from the opening in the anchoring device and to enter the second slot, thereby uncoupling the nut from the anchoring device. Means is provided for causing the nut to rotate together with the jackscrew when the lug is aligned with said second slot and the jackscrew is rotated in said one direction.

BRIEF DESCRIPTION OF DRAWINGS

For a better understanding of the invention, reference may be had to the following description taken in conjunction with the accompanying drawings, wherein:

In FIG. 3 the parts are depicted as being in the position they would be in if the movable switchgear unit 11 was rolled into the stationary enclosure 10 and the jackscrew 22 rotated to cause its lug 34 to enter the opening 41 in stationary anchoring device 40.

FIG. 4 is an enlarged side elevational view of the jackscrew assembly of FIGS. 1 and 3.

FIG. 5 is a sectional view along the line 5—5 of FIG. 4.

FIG. 6 is a plan view of a portion of the jackscrew assembly of FIG. 4.

FIG. 7 is an end view of the movable switchgear unit with parts removed to show the coupling between the jackscrew assemblies at opposite sides of the movable switchgear unit.

DESCRIPTION OF PREFERRED EMBODIMENT

GENERAL SWITCHGEAR APPARATUS

Figure 1:
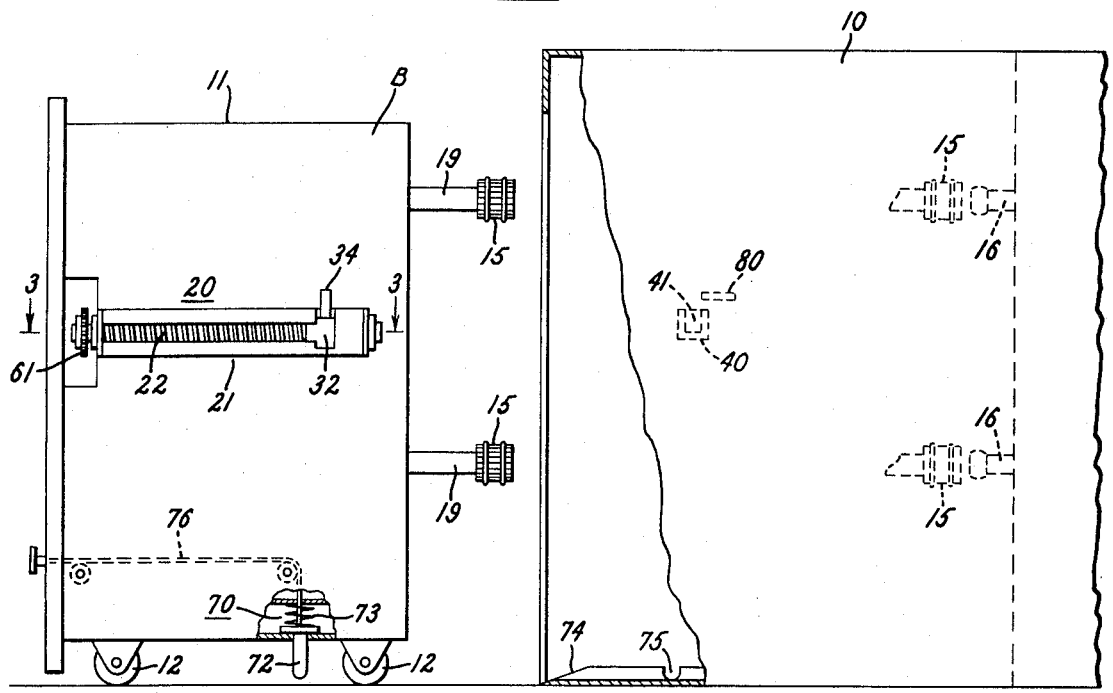
FIG. 1 is the side elevational view, partly in section, showing switchgear apparatus embodying one form of the invention. This figure depicts the movable switchgear unit in a position where it is fully withdrawn from its enclosure.

Referring now to FIG. 1, the switchgear apparatus shown therein comprises a stationary enclosure 10 and a removable, or drawout, switchgear unit 11 which is mounted on suitable wheels 12. The removable switchgear unit 11 may be thought of as comprising a main working portion (diagrammatically shown in box form at B) and studs 19 projecting therefrom far out in front of the main working portion B. The wheels 12 allow the removable unit 11 to be rolled horizontally from the withdrawn position shown to a fully inserted position inside the enclosure. In the fully inserted position a set of socket type contacts 15 carried by studs 19 of the movable switchgear unit 11 fully engage a set of plug-type stationary contacts 16 suitably supported on the enclosure 10. The position of the contacts 15 just prior to their engaging the stationary contacts 16 during an insertion operation is shown in dotted line form in FIG. 1. Mating pairs of contacts 15 and 16, when fully engaged, form the terminals for a power circuit (not shown) extending through the switchgear unit and suitably controlled thereby.

Figure 2:
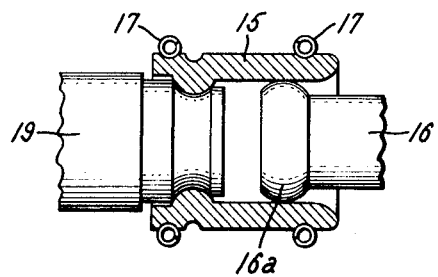
FIG. 2 is an enlarged sectional view of the contacts of the switchgear apparatus depicted in FIG. 1.

The contacts 15 and 16 are shown in detail in FIG. 2, where they are depicted in their fully engaged position. Each movable socket contact 15 is shown formed as a longitudinally segmented tube encircled by a pair of garter springs 17. The segments forming each tube are pivotally mounted on its conductive stud 19 carried by the movable switchgear unit. The right hand garter spring 17 forces the segments into high pressure engagement with the stud 19 and the left hand garter spring forces the segments into engagement with the stationary contact 16. Each of the stationary contacts 16 is shown formed with an enlarged head 16a over which the tubular socket contact 15 slides when moving toward or away from its fully connected position shown. To provide the desired contact pressures when the contacts are in their fully engaged position of FIG. 1, the garter springs 17 must be relatively strong; and as a result, considerable force is required to force the movable contacts into or out of their position of full engagement.

THE JACKSCREW ASSEMBLY

To aid in driving the switchgear unit 11 into its fully inserted position, a racking mechanism 20 is provided. This racking mechanism 20 comprises two substantially identical jackscrew assemblies 21 located at opposite sides of the movable switchgear unit and coupled together for operation in unison in a manner soon to be described. Each of these jackscrew assemblies comprises a jackscrew 22 that extends generally parallel to the direction of movement of the movable switchgear unit 11 within enclosure 10. Unless otherwise stated, the following description will be of the jackscrew assembly 21 shown in FIG. 1 at the right-hand side of the movable switchgear unit.

Figure 3:
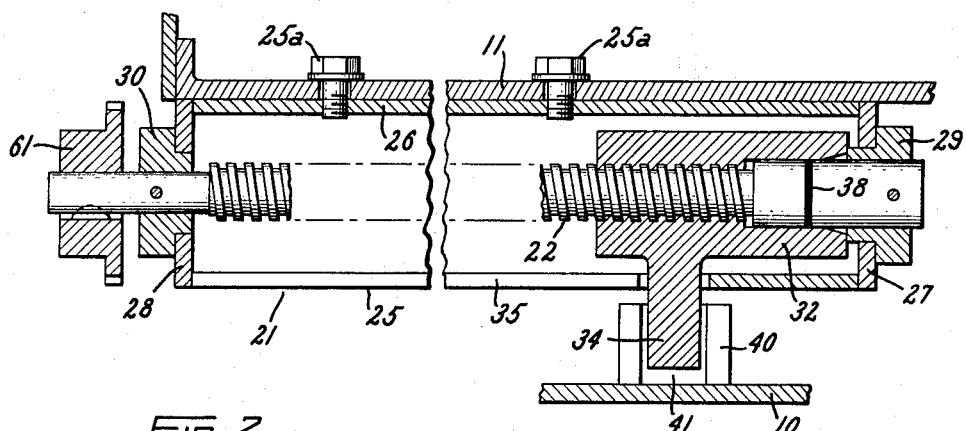
FIG. 3 is an enlarged sectional view along the line 3—3 of FIG. 1 of a jackscrew assembly forming a part of a racking mechanism embodying one form of my invention.

For mounting the jackscrew 22 on the movable switchgear unit, a housing 25 is provided therefor, and this housing is rigidly attached to the movable switchgear unit by suitable screws such as 25a (FIG. 3). Housing 25 comprises an elongated tubular member 26 and end walls 27 and 28 attached to the tubular member. The jackscrew is journaled in these end walls 27 and 28 so that it can freely rotate with respect to the housing, but it is prevented from moving axially with respect to the housing by suitable stops 29 and 30 at its opposite ends. End wall 27 is referred to hereinafter as the front end wall, and end wall 28 is referred to hereinafter as the rear end wall.

Within housing 25 there is provided a traveling nut 32 that has internal threads meshing with the external threads of jackscrew 22. This nut has a lug 34 projecting radially therefrom. For slidably receiving this lug 34 in a manner soon to be described, the housing 25 is provided with two slots 35 and 36 (FIG. 4). The first of these slots 35 extends axially of the jackscrew 22, and the second slot 36 extends generally perpendicular to the first slot 35 and communicates with the first slot. The major portion of the second slot 36 is located above the first slot 35; but the slot has a short extension 36a located beneath the major slot portion in alignment with the major slot portion.

As will soon be explained, when the switchgear unit 11 is withdrawn from the enclosure 10, the lug 34 is disposed within the second slot 36. When the lug 34 is within slot 36 or in alignment with slot 36, the bore of the traveling nut 32 is in frictional contact with a resilient O-ring 38 (FIG. 3) carried by the jackscrew. This O-ring 38 acts as a friction device which causes the nut 32 and the jackscrew 22 to rotate as a unit, assuming, of course, that the nut 32 is not then blocked from so rotating.

STOP MECHANISM 70

When it is desired to move the switchgear unit 11 from its solid line position of FIG. 1 into its fully inserted position within the enclosure 10, the switchgear unit is pushed into the enclosure until a stop mechanism 70 (FIG. 1) comes into play to temporarily prevent further movement of the switchgear unit to the right. As is schematically shown in FIG. 1, the stop mechanism 70 comprises a blocking plunger 72 and a compression spring 73 biasing the plunger downwardly. The lower end of this blocking plunger slides along the upper surface of a cam 74 as the switchgear unit moves to the right. Cam 74 is located in a position intermediate the sides of the switchgear unit. When the switchgear unit has been moved to the right a predetermined distance, the blocking plunger 72 is forced by spring 73 into a locking notch 75 on cam 74, which blocks further movement of the switchgear unit to the right until the plunger 72 is deliberately lifted from notch 75. For lifting the plunger from notch 75, suitable means, schematically shown as a cable 76, is operable from the front of the switchgear unit. When cable 76 is pulled by the operator, the plunger 72 is lifted from the locking notch 75 against the spring 73, and the operator is free to begin racking the switchgear unit toward its connected position.

ANCHORING DEVICE 40

The locking notch 75 is so positioned that it permits the movable switchgear unit to be pushed to the right sufficiently to cause the lug 34 on the traveling nut 32 to be in a position of alignment with an anchoring device 40 fixed to the enclosure 10. This anchoring device contains an opening 41 in the form of an open-ended groove that is adapted to receive the lug 34 on the nut 32.

RACKING OPERATION

The lug 34 is moved into the groove 41 in the anchoring device by rotating the jackscrew 22. The frictional contact between O-ring 38 and nut 32 causes the nut to rotate as a unit with the jackscrew, such rotation being permitted by the second slot 36. When the lug 34 has been moved by such jackscrew-rotation to the bottom of groove 41, as is shown in FIG. 3, further rotation of the nut with the jackscrew is blocked. But further rotation of the jackscrew 22 alone can continue, and this rotation causes the jackscrew to move longitudinally of the nut 32 due to the meshing relationship of its threads with those of the nut. This longitudinal movement of the jackscrew 22 is used for racking the movable switchgear unit 11 toward its fully inserted position, it being recalled that the jackscrew and the switchgear unit are coupled together insofar as longitudinal movement of the jackscrew is concerned.

During the early stages of this racking action, relative movement of the jackscrew 22 and the nut 32 is resisted by the frictional engagement present between the O-ring and the nut, but enough force is applied to the jackscrew to easily overcome this frictional resistance.

The anchoring device 40 is so located that when the lug 34 reaches the bottom of opening 41 in the anchoring device, the lug is aligned with the longitudinal slot 35 in the jackscrew housing 25. Accordingly, after a small amount of the above-described rotation of the jackscrew 22 relative to the nut 32 following entry of lug 34 into the opening 41 in the anchoring device, the jackscrew housing 25 has moved sufficiently with respect to the nut to cause the longitudinally extending slot 35 to receive the lug 34 on the nut. So long as the lug 34 is positioned within slot 35, the lug is locked within the opening 41 in the anchoring device and the nut is prevented from rotating together with the jackscrew. Accordingly, rotation of the jackscrew in either direction during this time (when lug 34 is in slot 35 and groove 41 in the anchoring device) produces longitudinal movement of the jackscrew and resultant racking motion of the movable switchgear unit 11.

If the jackscrew 22 is rotated in a direction to produce continued insertion of the movable switchgear unit 11, the jackscrew housing 25 continues moving with respect to the nut 32 until lug 34 reaches a position at the rear end of slot 35. At this point, the movable disconnect contacts 15 of the switchgear unit have fully engaged the stationary contacts 16.

To remove the switchgear unit from its fully inserted position, the jackscrew 22 is rotated in an opposite direction to that described. Slot 35 in housing 25 prevents the nut 32 from rotating together with jackscrew 22, thus moving the jackscrew longitudinally of the then-stationary nut. This jackscrew motion carries the switchgear unit to the left as viewed in FIG. 1 toward its completely disconnected position. When the switchgear unit reaches its fully disconnected position, blocking plunger 72 will drop into notch 75, thereby preventing further withdrawal of the switchgear unit until the blocking plunger is released. At this point in the withdrawal motion, the jackscrew has returned to a position wherein the lug 34 on nut 32 is aligned with the perpendicular slot 36 in housing 25, and the O-ring has reengaged the bore of the nut. Accordingly, further rotation of the jackscrew 22 causes the nut 32 to rotate with the jackscrew as a unit in a direction to withdraw the lug 34 from the anchoring device 40 and to cause the lug to enter the perpendicular slot 36. This completely uncouples nut 32 from anchoring device 40 and allows the movable switchgear unit to be completely withdrawn from enclosure 10. Such withdrawal can be effected whenever the stop mechanism 70 is released.

BLOCKING JACKSCREW ROTATION IN THE EVENT

SWITCHGEAR UNIT IS NOT PROPERLY LOCATED IN THE ENCLOSURE

During an insertion operation, if the switchgear unit 11 is not properly located in the enclosure 10 when the jackscrew is first turned, nut 32 will rotate slightly beyond 90° and the lug 34 will enter the extension 36a of the perpendicular slot 36 that is located below the axial slot 35. When the lug reaches the end of this slot extension 35a, further rotation of the nut 32 will be blocked, thus forcing any further rotation of the jackscrew to take place independently of the nut. Such rotation of the jackscrew relative to the nut forces the nut to move axially of the jackscrew toward the front wall 27 of housing 25. After only a short travel of the nut in this direction, the lug 34 will lock against the wall of slot extension 36a, thereby blocking further rotation of the jackscrew. To reposition the lug in its initial position in slot 36, the jackscrew must be rotated in an opposite direction to effect reverse rotation of the nut 32 through its frictional coupling at 38 with jackscrew 22. When the lug is thus repositioned, the switchgear unit 11 can be properly positioned to effect the desired entry of the lug 34 into the groove 41 when the jackscrew is again turned in a racking-in direction.

If the switchgear unit 11 is outside the enclosure 10 and the jackscrew 22 is, for some reason, rotated, after a small amount of such rotation the nut 32 will lock itself from traveling along the jackscrew in the same manner as described in the immediately preceding paragraph. That is, the jackscrew 22 and nut 32 will turn as a unit until lug 34 enters the slot extension 36a, following which a small amount of continued rotation of the jackscrew forces the nut to advance along the jackscrew until lug 34 locks against the wall of slot extension 34a. Further rotation of the jackscrew is blocked by this locking action.

BLOCKING THE SWITCHGEAR UNIT FROM

BEING PUSHED TOO FAR INTO THE ENCLOSURE

This locking of the traveling nut 32 in a position of alignment with slot 36 serves an important safety function. More specifically, it prevents the movable switchgear unit 11 from being pushed an excessive distance into the enclosure 10 before the lug 34 engages the anchoring device 40. If the nut, instead of thus locking itself in response to jackscrew rotation, had moved along the jackscrew 22 to the rear of the housing 25, then it would no longer be in a position to interfere with insertion of the movable switchgear unit until the switchgear unit had been almost fully inserted. This is undesirable because it would allow the switchgear unit 11 to be pushed by hand into a position where its disconnect contacts 15 are close to the stationary disconnect contacts 16. When the switchgear unit is in this position, it is desirable that it be mechanically locked by the racking mechanism against movement within the enclosure.

Another feature which prevents the movable switchgear unit from being pushed manually into an excessively inserted position beyond that determined by stop mechanism 70 is the presence of interference members 80 that are adapted to engage the lugs 34 should the lugs be in their vertical positions shown in FIG. 7. These interference members 80 are attached to the vertical walls of enclosure 10 in a position to engage the lugs 34 should an attempt be made to manually push the switchgear unit past the position determined by stop mechanism 70 when the lugs are in their vertical position. As previously mentioned, should the lugs 34 be in a horizontal position when such manual pushing of the switchgear unit is attempted, they will engage the anchoring devices 40, thus preventing further manual insertion of the switchgear unit. The feature described in the immediately preceding paragraph assures that the lugs, when horizontal and not in the slot 41 in anchoring device 40, will be in alignment with the slots 36 of the jackscrew housing 25.

THE SECOND JACKSCREW AND THE COUPLING BETWEEN THE TWO JACKSCREWS

For coupling together the two jackscrews 22 at opposite sides of the movable switchgear unit, a sprocket and chain drive 60 is provided at the outside face of the movable switchgear unit 11, as is shown in FIG. 7. This drive comprises two driven sprockets 60 and 62 respectively fixed to the jackscrews 22 and a drive sprocket 64 suitably journaled in the movable switchgear unit. A drive chain 66 meshing with the teeth of these sprockets extends about the peripheries of the sprockets. Suitable guide sprockets 67 and 68 are provided for guiding the chain. When the drive sprocket 64 is rotated by a suitable wrench applied to its shaft, it drives the chain 66 and imparts equal rotary motion to the driven sprockets 60 and 62. This causes the two jackscrews 22 to rotate in unison.

The left-hand jackscrew operates its traveling nut 32 and lug 34 in substantially the same manner as described hereinabove with respect to the right-hand jackscrew. The chain coupling 60 assures that operating events occur substantially simultaneously in the two jackscrew assemblies. A difference in the two structures, however, is that the lug 34 of the left-hand assembly is always in a position 180° displaced from the lug 34 of the right-hand assembly, as will be apparent from FIG. 6. To accommodate this difference, in the left-hand assembly, the major portion of the perpendicular slot 36 is below instead of above the axial slot 35.

GENERAL DISCUSSION

It will be apparent from the above description that the jackscrews 22 do not at any time project far out in front of the main working portion B of the movable switchgear unit 11. This assures that there are no projecting exposed ends of the jackscrews that are susceptible to being damaged by blows or contact with foreign objects. The housing 25 of each jackscrew, surrounding the jackscrew as it does, also acts to protect the jackscrew from mechanical damage, even when the switchgear unit 11 is in a completely withdrawn position outside the enclosure 10.

There are a number of features which enable the racking mechanism 20 to function properly despite substantial amounts of misalignment between the movable switchgear unit 11 and the stationary enclosure 10. One of these is that the traveling nuts 32 always remain in meshing engagement with their jackscrews 22 (instead of disengaging as in the aforesaid U.S. Pat. No. 3,440,371-Netzel). The disengageable parts of my racking mechanism are the lugs 34 and the slotted anchoring devices 40. Such parts can tolerate much more misalignment between units 10 and 11 than could be tolerated by disengageable screws and nuts. In this regard, if any such misalignment is present, it is much easier to cause the lugs 34 to enter the slots 41 than it is to cause jackscrews on the movable unit 11 to enter and mesh with nuts on the stationary enclosure 10. As one example, should my movable switchgear unit 11 be horizontally displaced from its intended position within enclosure 10 by a slight amount, the lugs 34 can still easily enter the slots 41 in the anchoring devices. As another example, should one of the lugs 34 not immediately enter its anchoring slot 41 at the time the other lug does, continued rotation of the jackscrew of said one lut will cause the associated nut to travel along the jackscrew (within limits permitted by the perpendicular slot 36) until the yet-unseated lug 34 moves into place within its anchoring slot 41.

Another feature which improves the racking mechanism's tolerance to misalignment between movable switchgear unit 10 and enclosure 11 is that the parts (34 and 40) of the racking mechanism relied upon for engagement and disengagement are not located far out ahead of the movable switchgear unit but are generally in line with the main working portion B of the movable switchgear unit. Certain misalignments of the movable unit 11 within its enclosure 10, such as might result from unit 10 being slightly skewed about a vertical axis, are effectively magnified when considered at a location far ahead of the movable switchgear unit, and larger deviations from normal positions must therefore be accommodated if the disengageable parts were located far ahead of B than if the disengageable parts are in the disclosed location.

The above-described ability to accommodate substantial misalignments is especially important where there are two jackscrews, instead of only a single one, since both jackscrews must be properly positioned with respect to their disengageable anchoring devices. Where the movable switchgear unit is a very large one, as may be the case with my arrangement, two jackscrews, preferably at opposite sides of the movable unit, are highly desirable in order to prevent the movable unit from cocking or skewing during insertion or withdrawal. Thus, in my two-jackscrew arrangement, increased tolerance of each jackscrew assembly to misalignment is important.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. Electric switchgear comprising an enclosure, a switchgear unit movable into and out of said enclosure, and racking mechanism for moving said switchgear unit into and out of a fully inserted contact engaging position within said enclosure, said racking mechanism comprising:
   a. a jackscrew,
   b. means for mounting said jackscrew on said switchgear unit so that said jackscrew is rotatable with respect to said switchgear unit, said jackscrew extending generally parallel to the direction of motion of said switchgear unit within said enclosure,
   c. a traveling nut mounted on said jackscrew and having a lug projecting radially therefrom,
   d. said jackscrew being movable axially with respect to said nut when rotated relative to said nut, thereby effecting movement of said switchgear unit if rotated relative to said nut while said nut is held against movement relative to said enclosure,
   e. an anchoring device fixed to said enclosure and having an opening that is adapted to receive said lug and hold said nut against movement relative to said enclosure when said jackscrew is being rotated to effect movement of said switchgear unit into and out of its fully inserted position,
   f. means for holding said lug in said opening in said anchoring device while said jackscrew is being rotated to effect movement of said switchgear unit comprising; structure fixed to said movable switchgear unit and containing a first slot that extends axially of said jackscrew for receiving said lug while said switchgear unit is moving to and from its fully inserted position,
   g. said structure also including a second slot extending generally perpendicular to said first slot and communicating with said first slot for receiving said lug when said lug is aligned with said second slot and said nut is rotated in one direction together with said jackscrew,
   h. rotation in said one direction of said nut together with said jackscrew when said lug is aligned with said second slot causing said lug to withdraw from the opening in said anchoring device and to enter said second slot, thereby uncoupling said nut from said anchoring device, and
   i. means for causing said nut to rotate together with said jackscrew when said lug is aligned with second slot and said jackscrew is rotated in said one direction.

2. The switchgear of claim 1 in which said means for causing said nut to rotate together with said jackscrew comprises a friction drive between said jackscrew and said nut which becomes operative when said nut is in a position where its lug aligns with said second slot.

3. The switchgear of claim 2 in which said friction drive is disabled from causing said nut and said jackscrew to rotate together when said nut is displaced from the location where its lug aligns with said second slot.

4. The switchgear of claim 1 in which said means for causing said nut to rotate together with said jackscrew comprises a ring of resilient material that is carried by said jackscrew in a position to frictionally engage said nut when said nut is in a position wherein its lug aligns with said second slot.

5. The switchgear of claim 1 in which at the start of a racking operation coupling of said nut to said anchoring device is effected by rotating said jackscrew together with said nut and said lug in an opposite direction to said one direction, thereby moving said lug into said opening in said anchoring device.

6. The switchgear unit of claim 5 in which means is provided for limiting movement of said lug in said opposite direction while in said opening in said anchoring device to a position wherein said lug aligns with said first slot and is free to enter said first slot during the early stages of a racking-in operation.

7. The switchgear of claim 5 in which:
   a. when said nut is uncoupled from said anchoring device, said lug is positioned in said second slot,
   b. blocking means is provided for blocking movement of said nut out of a position of alignment with said second slot if rotation of said jackscrew together with said nut in said opposite direction carries said lug past a position of alignment with said first slot.

8. The switchgear unit of claim 6 in which:
   a. when said nut is uncoupled from said anchoring device, said lug is positioned in said second slot,
   b. blocking means is provided for blocking movement of said nut out of a position of alignment with said second slot if rotation of said jackscrew together with said nut in said opposite direction carries said lug past a position of alignment with said first slot.

9. The switchgear of claim 1 in which:
   a. preparatory to a racking-in operation said movable switchgear unit is moved within said enclosure into a position wherein said lug aligns with said opening in the anchoring device,
   b. said nut is coupled to said anchoring device at the start of a racking-in operation by rotating said jackscrew together with said nut in an opposite direction to said one direction, thereby moving said lug out of said second slot into said opening in said anchoring device.

10. The switchgear of claim 1 in which:
    a. said second slot comprises one portion into which said lug must be moved to permit said nut to be uncoupled from said anchoring device,
    b. said second slot also comprises an extension portion on an opposite side of said first slot from said one portion for receiving said lug should said lug be carried past a position of alignment with said first slot,
    c. said extension portion of the second slot acts as a locking means for blocking movement of said nut out of a position of alignment with said second slot if rotation of said jackscrew together with said nut in an opposite direction to said one direction carries said lug past a position of alignment with said first slot.

11. The switchgear unit of claim 1 in which:
    a. said movable switchgear unit comprises a main working portion and current-carrying studs projecting far out in front of said main working portion for carrying current to and from said main working portion when said switchgear unit is fully inserted, b. said anchoring device is located generally in alignment with said main working portion, considered in the direction of movement of said movable switchgear unit, when said movable switchgear unit is in a position wherein said lug can be withdrawn from the opening in said anchoring device.

12. The switchgear unit of claim 1 in which:
a. the structure of (a), (b), (c), (f), (g), and (i) of claim 1 constitutes a first jackscrew assembly and the anchoring device of (e) of claim 1 constitutes a first anchoring device,
b. said first jackscrew assembly is located at one side of said movable switchgear unit for cooperation said first anchoring device,
c. a second jackscrew assembly corresponding to said first jackscrew assembly is provided on the opposite side of said movable switchgear unit, and
d. a second anchoring device is provided for cooperating with said second jackscrew assembly in substantially the same manner as said first jackscrew assembly cooperates with said first anchoring device, and
e. means is provided for mechanically coupling the jackscrews of said two assemblies together for rotation in unison.

* * * * *